(12) United States Patent
Mohan et al.

(10) Patent No.: US 9,311,371 B2
(45) Date of Patent: *Apr. 12, 2016

(54) DATA CELL CLUSTER IDENTIFICATION AND TABLE TRANSFORMATION

(71) Applicant: Business Objects Software Ltd., Dublin (IE)

(72) Inventors: Mayur Belur Mohan, Bangalore (IN); Saurabh Diwan, Curg (IN); Louay Gargoum, DB Killiney (IE)

(73) Assignee: Business Objects Software, Dublin (IE)

( * ) Notice: Subject to any disclaimer, the term of this patent is extended or adjusted under 35 U.S.C. 154(b) by 331 days.

This patent is subject to a terminal disclaimer.

(21) Appl. No.: 13/870,252

(22) Filed: Apr. 25, 2013

(65) Prior Publication Data

US 2013/0238644 A1  Sep. 12, 2013

Related U.S. Application Data

(63) Continuation of application No. 12/788,792, filed on May 27, 2010, now Pat. No. 8,433,714.

(51) Int. Cl.
*G06F 17/30* (2006.01)
*G06F 17/24* (2006.01)

(52) U.S. Cl.
CPC ........ *G06F 17/30569* (2013.01); *G06F 17/246* (2013.01)

(58) Field of Classification Search
CPC .......................... G06F 17/246; G06F 17/30569
See application file for complete search history.

(56) References Cited

U.S. PATENT DOCUMENTS

| | | | |
|---|---|---|---|
| 6,628,832 | B2 | 9/2003 | Kanatsu |
| 7,739,587 | B2 | 6/2010 | Vion-Dury |
| 8,112,459 | B2 | 2/2012 | Dettinger et al. |
| 8,433,714 | B2 | 4/2013 | Mohan et al. |
| 2002/0174143 | A1 | 11/2002 | Taboada et al. |
| 2007/0140565 | A1 | 6/2007 | Lin et al. |
| 2008/0016041 | A1 | 1/2008 | Frost et al. |
| 2008/0027908 | A1 | 1/2008 | Durbeck et al. |
| 2008/0168036 | A1 | 7/2008 | Young et al. |
| 2008/0256432 | A1 | 10/2008 | Sambandam et al. |
| 2008/0294679 | A1 | 11/2008 | Gatterbauer et al. |
| 2009/0044095 | A1 | 2/2009 | Berger et al. |
| 2010/0049746 | A1 | 2/2010 | Aebig et al. |

(Continued)

OTHER PUBLICATIONS

"U.S. Appl. No. 12/534,630, Examiner Interview Summary mailed Jun. 5, 2012", 3 pgs.

(Continued)

*Primary Examiner* — Scott A Waldron
(74) *Attorney, Agent, or Firm* — Schwegman Lundberg & Woessner, P.A.

(57) ABSTRACT

Various embodiments may operate to access individual lines of information included in a file stored in an electronic storage medium, to detect the existence of data clusters in the file based on neighboring cell content in a horizontal direction (corresponding to the individual lines), and in a vertical direction (orthogonal to the horizontal direction), to identify at least some of the data clusters as being associated with predefined table types (comprising vertical tables, horizontal tables, or cross tables), to merge some of the data clusters into section tables having common properties, and to transform the tables resulting from the merging activity, as well as remaining un-merged data clusters, into a single flat table. The stored file may comprise a spreadsheet file.

20 Claims, 6 Drawing Sheets

(56) References Cited

U.S. PATENT DOCUMENTS

| | | |
|---|---|---|
| 2010/0050264 A1 | 2/2010 | Aebig et al. |
| 2011/0029580 A1 | 2/2011 | Popovski et al. |
| 2011/0029852 A1 | 2/2011 | Naibo et al. |
| 2011/0295904 A1 | 12/2011 | Mohan et al. |
| 2012/0303645 A1 | 11/2012 | Kulkarni-puranik |

OTHER PUBLICATIONS

"U.S. Appl. No. 12/534,630, Non Final Office Action mailed Mar. 14, 2012", 7 pgs.

"U.S. Appl. No. 12/534,630, Notice of Allowance mailed Aug. 16, 2012", 5 pgs.

"U.S. Appl. No. 12/534,630, Response filed Jun. 5, 2012 to Non Final Office Action mailed Mar. 14 , 2012", 8 pgs.

"U.S. Appl. No. 12/788,792, Examiner Interview Summary mailed Jul. 12, 2012", 3 pgs.

"U.S. Appl. No. 12/788,792, Examiner Interview Summary mailed Aug. 30, 2012", 1 pg.

"U.S. Appl. No. 12/788,792, Final Office Action mailed Sep. 12, 2012", 14 pgs.

"U.S. Appl. No. 12/788,792, Non Final Office Action mailed Apr. 24, 2012", 14 pgs.

"U.S. Appl. No. 12/788,792, Notice of Allowance mailed Dec. 26, 2012", 12 pgs.

"U.S. Appl. No. 12/788,792, Response filed Jul. 11, 2012 to Non Final Office Action mailed Apr. 24, 2012", 13 pgs.

"U.S. Appl. No. 12/788,792, Response filed Dec. 12, 2012 to Final Office Action mailed Sep. 12, 2012", 9 pgs.

Gatterbauer, Wolfgang, et al., "Table Extraction using Spatial Reasoning on the CSS2 Visual Box Model", AAAI, (2006), 6 pgs.

Hu, Jianying, et al., "Why Table Ground-Truthing is Hard", IEEE, (2001), 5 pgs.

Kieninger, Thomas G, et al., "T-Recs Table Recognition and Validation Approach", AAAI Technical Report FS-99-04, (1999), 8 pgs.

Kieninger, Thomas G, "Table Structure Recognition Based on Robust Block Segmentation", SPIE vol. 3305, (Apr. 1998), 11 pgs.

Zaniddi, Richard, et al., "A Survey of Table Recognition: Models, Observations, Transformations, and Inferences", 7 IJDAR, (2004), 16 pgs.

Zuyev, Konstantin, "Table Image Segmentation", IEEE, (1997), 4 pgs.

DATA CELL CLUSTER IDENTIFICATION AND TABLE TRANSFORMATION

CLAIM OF PRIORITY

This application is a continuation of U.S. application Ser. No. 12/788,792 filed May 27, 2010, which application is incorporated in its entirety herein by reference.

COPYRIGHT

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2010 Business Objects Software Ltd. of Ireland, All Rights Reserved.

BACKGROUND

It is sometimes useful to load spreadsheets and other database files into business assessment and reporting software applications. When this occurs, the end-user is often left to visually determine how data should be grouped, such as whether a particular cell belongs to one cluster of data, or another. The resulting groups can then serve as a basis for data exploration, as well as producing reports and other documents. However, determining the boundaries for cell groups in a large spreadsheet can be tedious, and subject to human error.

BRIEF DESCRIPTION OF THE DRAWINGS

Some embodiments are illustrated by way of example and not limitation in the figures of the accompanying drawings, in which.

DETAILED DESCRIPTION

To address the challenge of grouping data within spreadsheets, various embodiments of the invention operate to identify data clusters in spreadsheet files, and to transform the clusters into a materialized table view that can be used for further analysis. Some spreadsheets have multiple complex clusters of data, where each cluster has specific information that is to be made available for data mining. These clusters may include flat horizontal tables, flat vertical tables, section tables, and/or cross tables, titles, section headers, and comments; all can serve as input for the transformation.

In some embodiments, the following activities are involved:

detecting data clusters associating titles/section headers with respective clusters identifying cluster table types (e.g., flat, cross)

identifying section breakdown regions & common table schemas providing a materialized table view for analysis.

The materialized table view created by various embodiments can be processed by business intelligence (BI) applications, including the SAP® BusinessObjects™ Explorer or Polestar analysis tools, to allow users to enter keyword searches against data stores and receive results back in the form of reports, dashboards, and visualizations. Some embodiments operate to create metadata that includes cluster characteristics and other information that can be used by BI applications to make calculations and build reports. By implementing various embodiments, a materialized table view can be created automatically, removing the larger part of a burden formerly imposed on the end-user.

Many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Various embodiments of the invention operate to receive data from spreadsheets and other data files, including Microsoft® Excel™ spreadsheets, perhaps by accessing (e.g., scanning) the data one line at a time. The information received is then analyzed to detect the existence of clusters, to create metadata that includes the characteristics of the clusters, and finally to provide a materialized table view as a single flat table for further analysis.

Figure 1:
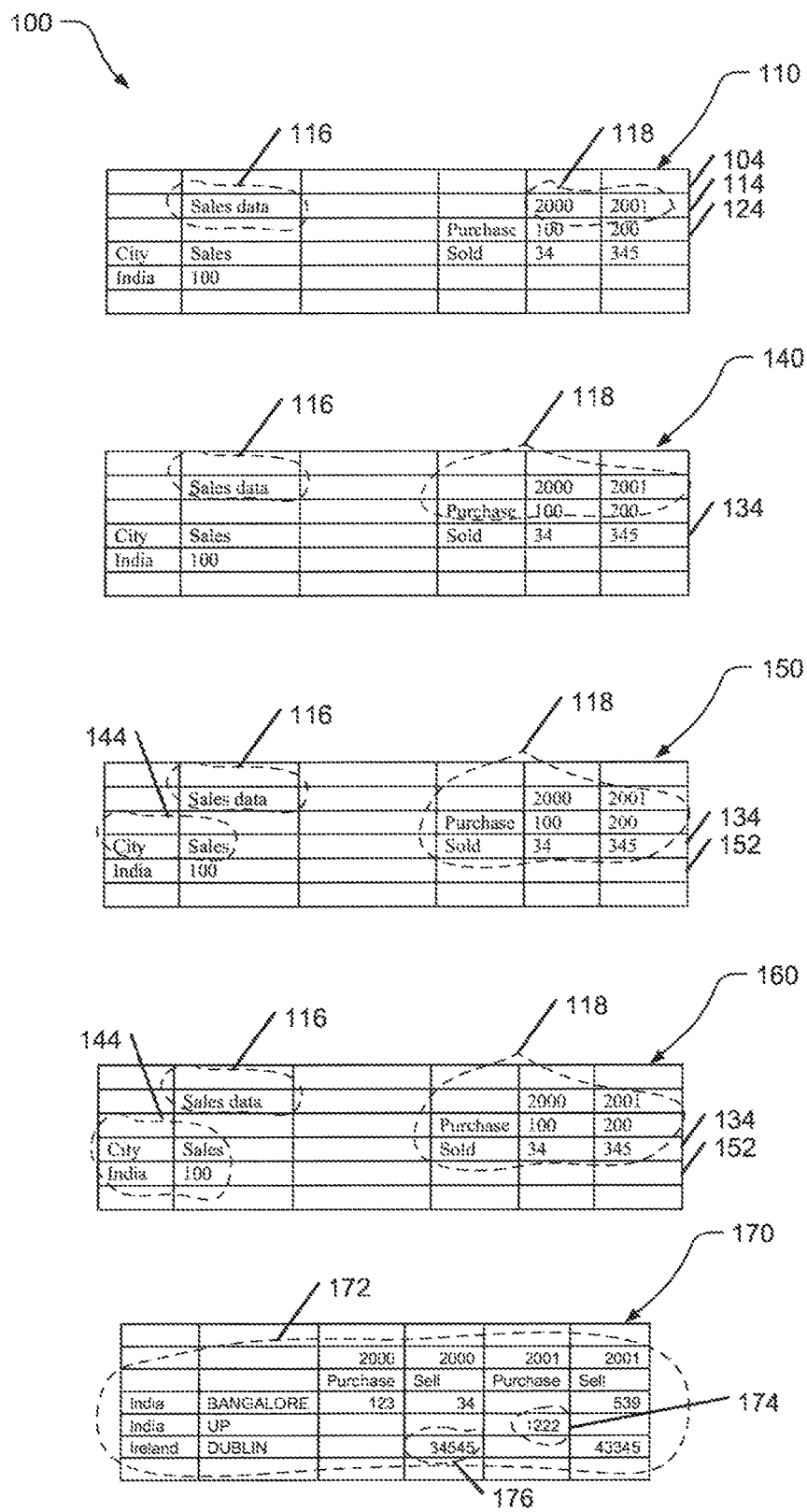
FIG. 1 illustrates cluster detection, according to various embodiments of the invention.

FIG. 1 illustrates cluster detection 100, according to various embodiments of the invention. Here multiple tables within a spreadsheet can be supported, with each table being of a different type. Titles and section headers associated with each table can also be identified.

The detection of data clusters is based on the concept of computational geometry. For example, assume that a spreadsheet comprises clusters of data that include tables, (e.g., horizontal/vertical flat tables, cross tables, etc.), titles, section headers, and comments. Various embodiments operate to read the data in the spreadsheet file row by row to detect clusters of data, and to initialize and populate cluster data structures according to some defined grammar rules. The rules will now be explained.

Rule #1. Identify a cell as new cluster if the neighboring vertical-up and horizontal-left cells are both blank.

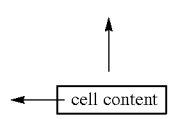

Rule #2. If a cell touches a neighboring cluster within Cartesian coordinates (distance=1) along the horizontal-left cell, or vertical-up cell directions in two-dimensional spreadsheet space, then associate the cell with the cluster that is touched. In other words, if X, Y are cells in a two-dimensional space and C is a nearby cluster, then X, Y∈C only if the distance between elements of the cluster=1, i.e. MAX (d(X, Y)=1). Structures, including metadata structures, can be updated to include revised cluster characteristic information.

Rule #3. If the end of the row is detected during scanning, then go on to the next row in the spreadsheet file. The end of the row is determined by some selected number of consecutive blank cells (e.g., twenty-six) after the last non-empty cell is detected in the spreadsheet.

Rule #4. If the number of blank rows exceeds some selected number (e.g., fifty), stop scanning rows in the spreadsheet file, since this indicates the end of the spreadsheet data.

Rule #5. For a given cluster with an entry point having cell coordinates [x,y], the entry point can be designated as Cell[x, y]. Initially:
Cluster_MaxUp=Cluster_MaxDown=x
Cluster_Maxleft=Cluster_MaxRight=y As more cells that belong to the cluster are discovered, the x-coordinate of the first row of the cluster would be designated as Cluster_MaxUp. If new cells are discovered to be in the cluster, such that the x-coordinate value increases, then the value of Cluster_MaxDown is updated to include the increased x-coordinate value. If new cells are discovered in the cluster, such that the y-coordinate value increases, then this y-coordinate value is assigned to Cluster_MaxRight; if the y-coordinate value for newly-discovered cells in the cluster decreases, then Cluster_MaxLeft is updated.

Rule #6. This rule has three sub-rules. When a cell touches a cluster to the left in a horizontal direction (i.e., horizontal-left) the priority of applying the rules is: 6.3, then 6.2, then 6.1. When a cell touches a cluster on its upper side, in the vertical direction, only rule 6.2 is applied. The three sub-rules are now explained.

Rule #6.1 If a cell has its y-coordinate at distance of one from the Cluster_MaxRight variable value of a detected cluster, then the cell will be associated with that cluster. In other words, for a cluster C, if Distance(Cell[y]−C[Cluster_MaxRight])=1, then Cell(x, y)∈C.

Rule #6.2 Create a line segment by making use of cluster_uid structure attributes. Identify the line segment edge coordinates (i.e. extreme left and extreme right coordinates). If the x-coordinate of the cell is the same as the line segment edge x-coordinate, and the y-coordinate of the cell lies between line segment extreme left and extreme right y-coordinates, then the cell is associated with that cluster.

In other words, if L is the line segment, $(X_L, Y_L)$, then let $(X_R, Y_R)$ be the extreme left and extreme right edge coordinates of the line L. Let C be the cluster that is to be potentially associated with the cell. Assume the following cluster characteristics:
Cluster C={UID, Cluster_MaxRight[y], Cluster_MaxLeft[y], Cluster_MaxUp[x], Cluster_MaxDown[x]}
The resulting line segment can be built using these values, as follows:
For vertical-up cell: $X_L=X_R=$Cluster_MaxDown[x]−1
For horizontal-left cell: $X_L=X_R=$Cluster_MaxDown[x]
$Y_L=$Cluster_MaxLeft[y]
$Y_R=$Cluster_MaxRight[y]

$$(X_L, Y_L) \xrightarrow{L(\text{line segment})} (X_R, Y_R)$$

For example, to identify the cluster to which Cell(X2, Y2) belongs, the following formula can be used:

Cell(X2,Y2)∈C if [Cell(X2)=$X_L=X_R$ and Cell(Y2)≥$Y_L$ and Cell(Y2)≤$Y_R$]

Rule #6.3 If Cell(X, Y) has cluster attributes that are the same as those of a cluster that is already detected, then it becomes the horizontal-left cell cluster of a Cell(x,y).

Rule #7. If a cell touches clusters in both the vertical and horizontal directions (i.e., horizontal-left and vertical-up), the cell is associated with the cluster that was first detected. For example, if sequence numbers are assigned in increasing value to clusters as they are detected in time, then the cell will be associated with the cluster having the lower sequence number. After association, the cluster having the higher sequence number will be merged with the cluster having the lower sequence number.

To determine the values for the edges of a merged cluster, the value of the individual variables Cluster_MaxRight[y], Cluster_MaxLeft[y], Cluster_MaxUp[x], Cluster_MaxDown[x] from each of the clusters prior to merging can be compared. For example, assume clusters C1, C2 have been detected. Cluster C1 can be defined by C1={C1uid, C1mr, C1ml, C1mu, c1md}, where C1uid=cluster sequence number, C1mr=cluster C1 max right, C1ml=cluster C1 max left, C1mu=cluster C1 max up, and C1md=cluster C1 max down. Cluster C2 can be defined by C2={C2uid, C2mr, C2ml, C2mu, C2md}, where C2uid=cluster sequence number, C2mr=cluster C2 max right, C2ml=cluster C2 max left, C2mu=cluster C2 max up, and C2md=cluster C2 max down.

Assume that C1uid<C2uid and C1mr<C2mr, C1ml<C2ml, C1mu<C2mu, C1md<C2md. If this is the case, then C2uid<C2uid, so C2 can be merged with C1. Then, if Cm is the cluster resulting from the merger (e.g., the "merged cluster"), then Cm may be defined by Cm={C1uid, C2mr, C1ml, C1mu, C2md}. Thus, after the association of the cell, one of the clusters touched by the cell would cease to exist as a separate cluster, since it has been merged into the other cluster touched by the cell.

As a more concrete example, consider a non-empty cell that is received as part of scanning activity with respect to the original spreadsheet file. It is determined that this cell touches (is within a Cartesian coordinate distance of one from) a first cluster having an assigned sequence number of 5 on the left, and a second cluster having an assigned sequence number of 3 on top. Since the second cluster has a lower sequence number, the cell is associated with the second cluster, and the first cluster is then merged into the second cluster to create a larger cluster with the sequence number of 3. The cluster with a sequence number of 5 no longer exists.

Rule #8. Any orphan clusters detected that lie within boundaries of any other cluster are merged into that cluster as a parent cluster.

The following five activities can be used to apply the rules. First, identify a cell as a new cluster if the neighbor vertical-up and horizontal-left cells are empty/blank. Initialize the cluster data structures and assign initial values to the variables Cluster_MaxRight, Cluster_MaxLeft, Cluster_MaxUp, Cluster_MaxDown variables with respect to the new cluster.

Second, if a new cell has vertical-up cell or horizontal-left cell values (i.e., it is touching a previously-identified cluster to the left or in the upward directions), then associate it with a suitable cluster. Here association would be done with the cluster having the lowest sequence number.

Third, for each cluster, and for the typical cell(x,y) that is determined to belong to the cluster, the value of x taken from the entry point Cell[x,y] is already assigned to the Cluster_MaxUp[x] value. If cell(x,y) x-coordinate value>Cluster_MaxDown[x], then the Cluster_MaxDown[x] value can be updated with the cell(x,y) x-coordinate value. If cell(x,y) y-coordinate value>Cluster_MaxRight, then the Cluster_MaxRight[y] value can be updated with the cell(x,y)

y-coordinate value. If cell(x,y) y-coordinate value<Cluster_MaxLeft, then the Cluster_MaxLeft[y] value can be updated with the cell(x,y) y-coordinate value.

Fourth, if the horizontal-left cell touching cell(x,y) belongs to one cluster, and the vertical-up cell touching the cell(x,y) belongs to another cluster, then merge the cluster with the higher sequence number into the cluster with the lower sequence number. During the merge activity, compare the Cluster_MaxRight, Cluster_MaxLeft, Cluster_MaxUp, Cluster_MaxDown variable values for each cluster, assigning the higher values of each pair to the Cluster_MaxRight and Cluster_MaxDown variables, and the lowest values of each pair to the Cluster_MaxLeft and Cluster_MaxUp variables.

Fifth, identify parents of orphan clusters/cells and if a parent is found, merge the orphan cluster into the parent cluster.

Whenever clusters are detected, metadata comprising the available information for each cluster can be stored in a data structure, as follows: Structure Cluster_UID={UID, Cluster_MaxRight[y], Cluster_MaxLeft[y], Cluster_MaxUp[x], Cluster_MaxDown[x]}, where Cluster_UID is the cluster sequence number that is based on the sequence in which new clusters are detected during row scanning of the rows in the original spreadsheet file. This metadata can be updated when changes in the cluster characteristics are detected, such as changes in the cluster edge locations due to merger activity. An example of how cluster detection 100 is accomplished by applying the eight rules described above, according to these five activities will now be given.

Consider the spreadsheet data file 110 shown in FIG. 1. The first line 104 is read, comprising only blank cells. Since the first 26 cells are blank (not all are shown in the figure), the rules declare that the end of the first line has been reached. A variable which signifies the number of continuous blank rows is incremented.

The next (second) line 114 is scanned. In this case, after finding one empty cell at location (2,1), the cell at coordinate location (2,2) (i.e., cell(2,2)) is found to be non-empty—it has the value "Sales data". Thus, the content of neighboring cells is investigated to determine whether they are empty, or non-empty. In this case, it appears that cell(2, 1) (i.e. horizontal-left) and cell(1, 2) (i.e., vertical-up) are empty. Thus, according to the rules, Cell[2,2] is the entry point to a new cluster. The metadata for this first cluster can be stored as Structure Cluster_1={1, 2, 2, 2, 2}.

In this second line 114, it turns out that cell(2, 5) is also non-empty, having the content "2000". Upon investigation, its neighboring cells vertical-up cell(1,5) and horizontal-left cell(2, 4) are found to be empty. Thus, another new cluster has been found. The metadata for this second cluster can be stored as Structure Cluster_2={2, 5, 5, 2, 2}.

In the second line 114, cell(2, 6) is the next cell encountered. In this case, the horizontal-left cell(2,5) is non-empty, and belongs to the cluster having sequence number 2, since its cluster characteristics are common to the Structure Cluster_2 cluster attributes. Thus, cell(2,6) is associated with the Cluster_2 cluster. In addition, since the y-coordinate of cell(2,6) exceeds the prior cluster_MaxRight value in cluster 2, the cluster_MaxRight value will be updated, so that the metadata for cluster 2 now reads as follows: Structure Cluster_2={2, 6, 5, 2, 2}. Thus, after scanning two rows 104, 114, clusters 116, 118 have been identified.

The third line 124 is now scanned. Here it can be seen that empty cells are encountered until cell(3,4), which has the content "Purchase". This cell has no non-empty neighbors in the horizontal-left or vertical-up directions (i.e., cell(3,3) and cell(2,4) are empty), so cell(3,4) is designated as a new cluster. The metadata for this third cluster can be saved as Structure Cluster_3={3, 4, 4, 3, 3}.

Cell(3,5) with content "100", next in the line 124, has non-empty neighbors in both horizontal-left and vertical-up directions (i.e., cell(2,5) and cell(3,4)). Using the cluster detection rules, we can say cell(2,5) is part of cluster 2 as its cluster characteristics are the same as that of Structure Cluster_2 cluster characteristics. Similarly, cell(3,4) is part of cluster 3 as its cluster characteristics match those of the Structure Cluster_3 cluster. Thus, cell(2,5) belongs to cluster 2, and cell(3,4) belongs to cluster 3.

Here the cluster sequence number for cell(2,5) is 2, and the cluster sequence number for cell(3,4) is 3. Therefore, cell(3, 5) is associated with cluster 2, and cell(3,5) as cluster 3 is merged into cluster 2 so that cluster 3 no longer exists.

Since two clusters have been merged, the variable values Cluster_MaxLeft, Cluster_MaxRight, Cluster_MaxUp, and Cluster_MaxDown associated with the cluster characteristics for cluster 2 are updated. In this case, the value of the y-coordinate of cell(3,4) is less than the cluster 2 Cluster_MaxLeft value, so the Cluster_MaxLeft value is updated. In addition, for cell(3,4), the value of the x-coordinate exceeds the value of Cluster_MaxDown, so this value is also updated, giving the new metadata values of Structure Cluster_2={2, 6, 4, 2, 3}. There is no change in the value of Cluster_MaxRight as the y-coordinate value of Cell(3,4), Cell(3,5) is lower than the value of Cluster 2 Cluster_MaxRight value (i.e., 4<6 and 5<6). Similarly, there is no change in the value of Cluster_MaxUp as the x-coordinate of Cell(3,4), Cell (3,5) is higher than the value of cluster 2 Cluster_Maxup (i.e., 3<2). The identified clusters 116, 118 now appear as shown at 140.

As the last cell in the third line, cell (3,6) has non-empty neighbors in both the horizontal-left and vertical-up directions. Using the cluster detection rules, it is known that cell (2,6) is part of cluster 2, because cell[Cluster_Maxleft]>cluster_2[Cluster_Maxleft], cell[Cluster_MaxRight]=cluster_2[Cluster_MaxRight], and cell[Cluster_MaxDown]=cluster_2[Cluster_MaxDown].

Similarly, cell (3, 5) is known to be part of cluster 2, because cell[Cluster_Maxleft]>cluster_2[Cluster_Maxleft], cell[Cluster_MaxRight]<cluster_2[Cluster_MaxRight], and cell[Cluster_MaxDown]=cluster_2[Cluster_MaxDown].

Thus, cell(2,6) belongs to cluster 2, and cell(3,5) also belongs to cluster 2. Therefore, cell(3, 6) is also part of cluster 2, and the metadata for cluster 2 is stored as Structure Cluster_2={2, 6, 4, 2, 3}.

The fourth line 134 is now scanned. Cell(4,1) is non-empty, having the content "city", and the horizontal-left and vertical-up neighbors are empty. Thus, a new cluster is found, and the cluster characteristics can be stored in a structure as Structure Cluster_4={4, 1, 1, 4, 4}.

The next cell in the line 134 (i.e., cell(4,2)) is also non-empty, and has a non-empty neighbor at cell(4,1). The neighbor cell(4,1) is part of cluster 4, and so cell(4,2) is associated with cluster 4. Here the y-coordinate value of cell(4,2)>Cluster 4[Cluster_MaxRight] value (i.e., 2>1). So the value of Cluster_MaxRight is updated, and Structure Cluster_4={4, 2, 1, 4, 4}.

The next non-empty cell encountered is cell(4,4), which has a non-empty vertical-up neighbor cell(3,4) that forms a part of cluster 2, because in cell(3,4), cell[Cluster_Maxleft]>cluster_2[Cluster_Maxleft], cell[Cluster_MaxRight]<cluster_2[Cluster_MaxRight], and cell[Cluster_MaxDown]=cluster_2[Cluster_MaxDown])).

The x-coordinate of the cell(3,4), or Cell[x]>cluster 2[cluster_maxdown] (i.e., 4>3). So the Cluster_MaxDown value is updated, and Structure Cluster_2={2, 6, 4, 2, 4}. There is no change in the Cluster 2 Cluster_MaxRight, Cluster_MaxLeft, Cluster_MaxUp values as the y-coordinate of cell(3,4) or Cell[y]=Cluster 2[Cluster_MaxLeft]. In addition, Cell[y]<Cluster 2[Cluster_MaxRight], and Cell[x]>Cluster 2[Cluster_MaxUp].

Cell(4,5) is now scanned, with neighbors in both the horizontal-left and vertical-up directions (i.e., cell(4,4) and cell (3,5)). Using the cluster detection rules, it is determined that both neighbors belong to cluster 2, so cell (4,5) is also associated with cluster 2. This activity is repeated with respect to cell(4,6), and the cluster 2 cluster characteristics are updated so that Structure Cluster_2={2, 6, 4, 2, 4}. At this point, there are now three clusters: first cluster 116, second cluster 118, and fourth cluster 144, as shown at 150.

The fifth line 152 is now scanned. Here the first cell encountered is cell(5,1), which touches vertical-up cell (4,1) that belongs to cluster 4, because 4=4(Cluster 4[Cluster_MaxDown]), 1=1(Cluster 4[Cluster_MaxLeft]) and 1<2 (cluster 4[Cluster_MaxRight])). Thus cell(5,1) is associated with cluster 4, and since Cell[x]>cluster 2[cluster_maxdown] (i.e., 5>4), the Cluster_MaxDown value is updated, and Structure Cluster_4={4, 2, 1, 4, 5}.

Cell(5,2) is the next cell encountered in the scan, with neighbors in both vertical-up and horizontal-left directions. Each neighbor belongs to cluster 4, and so cell(5,2) is likewise associated with cluster 4. There is no change in Cluster 4 Cluster_MaxRight, Cluster_MaxLeft, and Cluster_MaxUp values (i.e., Cell[y]=Cluster 4[Cluster_MaxLeft], Cell[y]=Cluster 4[Cluster_MaxRight], and Cell[x]>Cluster 4[Cluster_MaxUp]).

After scanning the fifth line 152, three clusters have been identified: Cluster_1, Cluster_2, and Cluster_4, shown respectively at 160 as clusters 116, 118, 144. For each cluster detected, the values of Cluster_Maxleft, Cluster_MaxRight, Cluster_MaxUp, and Cluster_MaxDown are known.

Any detected orphan cluster that lies within the boundaries of another cluster is considered to be part of the cluster within which boundaries it lies. An example of this kind of integration can be seen at 170 in FIG. 1, where clusters 3 and 4 (174, 176 respectively) lie within the boundary of cluster 2 (172).

Here the cluster characteristics are stored as Structure Cluster_2={2, 6, 1, 2, 6}, Structure Cluster_3={3, 5, 5, 5, 5}, and Structure Cluster_4={3, 4, 4, 6, 6}. In this case, Cluster_3 174 and Cluster_4 176 will become integral parts of Cluster_2 172 because:

For Cluster_3:
1. Cluster_3 Cluster_MaxLeft value≥Cluster_2 Cluster_MaxLeft value,
2. Cluster_3 Cluster_MaxRight value≤Cluster_2 Cluster_MaxRight value,
3. Cluster_3 Cluster_MaxUp value≥Cluster_2 Cluster_MaxUp value, and
4. Cluster_3 Cluster_MaxDown value≤Cluster_2 Cluster_MaxDown value.

For Cluster_4:
1. Cluster_4 Cluster_MaxLeft value≥Cluster_2 Cluster_MaxLeft value,
2. Cluster_4 Cluster_MaxRight value≤Cluster_2 Cluster_MaxRight value,
3. Cluster_4 Cluster_MaxUp value≥Cluster_2 Cluster_MaxUp value, and
4. Cluster_4 Cluster_MaxDown value≤Cluster_2 Cluster_MaxDown value.

Thus, Cluster_3 and Cluster_4 become an integral part of Cluster_2, and cease to exist.

The association of labels (e.g., titles, section headers, comments, etc.) with data clusters will now be explained. To qualify as a label, the cluster in question should have Cluster_MaxRight=Cluster_MaxLeft. The association of labels with clusters is then based on the distance Cluster_MaxLeft and Cluster_MaxUp. For the following rules, assume that 'S' is a label cluster. To determine the label type, let 'R1', 'R2', 'R3' be the clusters of a vertical table type.

If the label is a title, the shortest distance of Cluster_MaxUp of cluster 'S' from clusters R1, R2, R3 DistanceX=|S(Cluster_MaxUp)−R(Cluster_MaxUp)|. Also, the shortest distance of Cluster_MaxLeft of cluster 'S' from clusters R1, R2, R3 (distance should be ≥0) DistanceY=|S(Cluster_MaxLeft)−R(Cluster_MaxLeft)|.

If the label is a section header, the shortest distance of Cluster_MaxUp of cluster 'S' from clusters R1, R2, R3 DistanceX=|S(Cluster_MaxUp)−R(Cluster_MaxUp)|. Also, the shortest Distance of Cluster_MaxLeft of cluster 'S' from clusters R1, R2, R3 (distance should be 1) DistanceY=|R(Cluster_MaxLeft)−S(Cluster_MaxLeft)|. If more than one section header is associated with a cluster, DistanceY can be used to identify existing parent-child section header hierarchies.

The cluster data structure can be modified to hold additional cluster characteristic information, such as information regarding labels and section headers. For example:
Structure Cluster_UID={UID, Cluster_MaxRight[y], Cluster_MaxLeft[y], Cluster_MaxUp[x], Cluster_MaxDown[x], Cluster_Sections[SectionName, DistanceY, relative_position], Cluster_Name}
Clusters identified as labels should be deleted once they have been associated with other clusters.

After all of the clusters in a file have been detected, the table types to be associated with each cluster can be identified. The following analysis is accomplished for each cluster.

The identification of table types can be accomplished using the concept of a decision tree. In various embodiments, a decision tree with exception handling is used, with comparisons against standard templates (e.g., "exception logic") implemented as the pruning standard. This is different than the standard decision tree, and operations can best be understood by noting that:
several possibilities (e.g., table types) are proposed
the proposals are validated using each line of the table, using the standard templates
during validation, the tree is pruned to reduce the number of proposals by one As clusters are evaluated for association with table types, jokers may be encountered. A "joker" is a string in a cell that causes the decision tree to drop the use of a template, or prune the tree (e.g., a matching template for a vertical table, cross table, or horizontal table). The first time a joker is encountered (e.g., assume the joker content is "N/A"), the current template that is being used by the decision tree for matching is not dropped. Further occurrences of the same joker will not cause the template to be dropped, and will in fact confirm the existence of "N/A" as a joker in this example. However, once a first joker is confirmed, if a second joker is found (e.g., in this case, the second joker might be the string "not applicable"), the template will be dropped/pruned. Thus, a single table can have as many of one joker as desired, but more than one joker will cause the matching table type to be pruned. It should be noted that a single occurrence of one string does not constitute a joker. Similarly, when one joker is confirmed by finding more than one occurrence of the same string in a table, finding a second string does not constitute the appearance of a second joker (until the second time the second string is found).

In the evaluation of associating a cluster with a given table type, the occurrence of jokers might cause the analysis to fail. For example, in a vertical flat table a column having numeric values should be followed by numeric values in all the subsequent cells for that column, but presence of user-defined values (e.g., "N/A") would not fit the standard template for a vertical table. The acceptance of jokers in some embodiments thus lends a degree of tolerance to the analysis, resulting in handling a confirmed joker as an exception that does not automatically result in pruning one of the available table types that are available for consideration. This is how the decision tree with exception handling differs from standard decision tree analysis.

Figure 6:
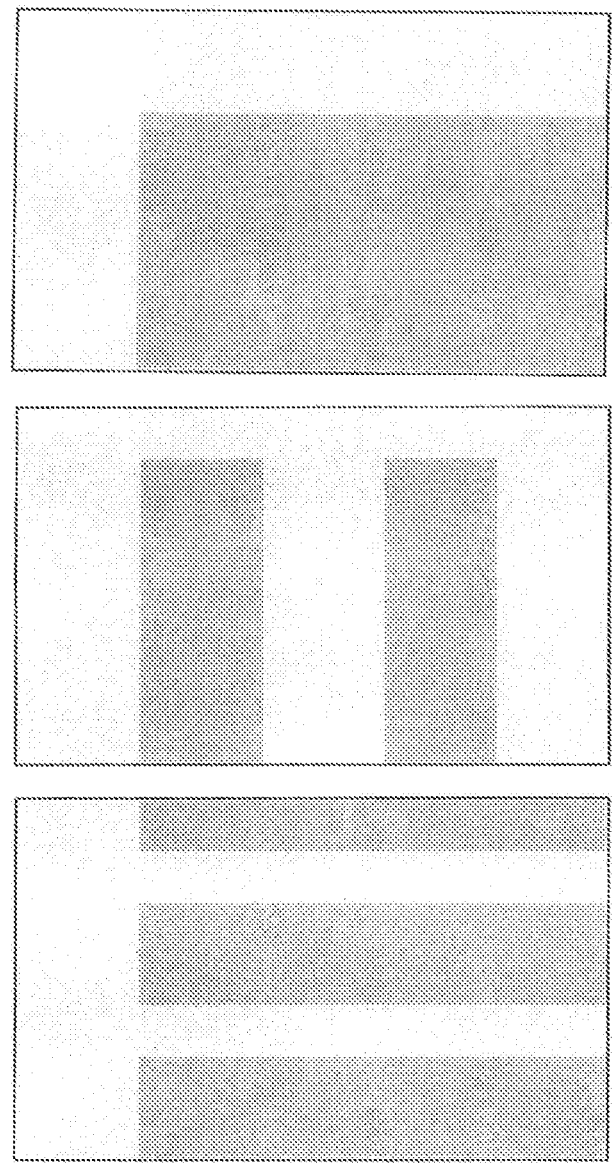
FIG. 6 illustrates table templates according to various embodiments of the invention.

FIG. 6 illustrates table templates according to various embodiments of the invention. Three different table templates are shown. Table I is for a cross table, Table II is for a vertical table, and Table III is for a horizontal table. Each template has a unique structure.

For the Cross Table (Table I), the first n rows can have all elements as string type. The first n columns can have all elements as string type. In the first row, if the first cell is empty and if one cell in that row has a numeric value, then all other cells after this cell in the same row should be numeric. Any pattern of change in the data (e.g., from one cell with a string to all other cells in the row being numeric) is to be followed throughout in all the rows of the table. Data clusters should start with a numeric value.

For the vertical table (Table II), the first row is the column header. It comprises non-empty cells of string type, with no more than one joker. From the second row onward, rows may have a combination of numeric and string type content, in any order. The pattern of data types in the second row should be followed in all other rows until the end of the table.

For the horizontal table (Table III), the first column should comprise non-empty cells of string type, with no more than one joker. Subsequent rows should have cells of the same data type (e.g., all numeric, or all string, etc.).

When attempting to match either vertical or horizontal templates, it should be understood that headers are skipped. Matching is accomplished by examining the body of the cluster, and not the header(s).

Those readers that desire additional information as to how table types can be identified and associated with clusters can refer to the attached Appendix, which also forms a part of this Detailed Description. The Appendix includes an implementation algorithm and an additional example of this part of the process.

After cluster table types have been identified and associated with various clusters, section tables can be used to combine clusters having common table schemas. To begin this process, it can be noted that each cluster now has the following information available, perhaps stored as metadata:
Structure Cluster_UID={UID, Cluster_type, Cluster_ColHeader[ ], Cluster_MaxRight[y], Cluster_MaxLeft[y], Cluster_MaxUp[x], Cluster_MaxDown[x], Cluster_Sections [SectionName, DistanceY, relative_position], Cluster_Name}

Here the variables Cluster_Sections[SectionName, DistanceY, relative_position] can be useful in identifying the orientation of cluster section headers between clusters. Thus, the DistanceY=|R(Cluster_MaxLeft)−S(Cluster_MaxLeft)|, where SectionName=name of the section header, Relative_position=coordinate position along spreadsheet where the section is found.

Section tables can be built up from individual component clusters based on three conditions: (a) each cluster should have same Cluster_MaxLeft and Cluster_MaxRight values, (b) the associated table Cluster_ColHeader should be the same, and (c) using the relative_position coordinates of Cluster Section headers that belong to different clusters, the header y-coordinates should be the same, and the header x-coordinate should be associated with the same distance from the Cluster_MaxUp value. In other words, the component clusters should have the same row header labels, the same orientation (e.g., cluster Maxleft and MaxRight values are the same), and the same section header relative position with respect to the section body.

Clusters which satisfy all these conditions will be merged into section tables. Section headers may contribute an additional column to the resulting section table. If nested section headers exist, additional parent-child columns can be added to the section table.

Once section tables have been created, a materialized table view can be provided, which can in turn be used for additional analysis. For the purposes of this document, a "materialized table" means a flat vertical (or horizontal) table, without blank cells, special characters, or repeated strings in merged cells. Thus, the materialized table constitutes a transformed view of the original spreadsheet file, where inconsistencies are dramatically reduced, or even entirely removed. Simply merging clusters is generally not sufficient to conduct business analysis, and the resulting flat table can be easily imported and utilized by various BI programs.

To begin the process of creating the materialized view, it can be noted that at this point in the process, clusters have been detected, cluster types (as being associated with standard table types) have been determined, and labels have been associated with the identified clusters. Clusters meeting common conditions have been merged into section tables. The following information, as cluster characteristics, is available for each cluster:
Structure Cluster_UID={UID, Cluster_type, Cluster_ColHeader[ ], Cluster_MaxRight[y], Cluster_MaxLeft[y], Cluster_MaxUp[x], Cluster_MaxDown[x], Cluster_Sections [SectionName, DistanceY, relative_position], Cluster_Name, JokerValue}

In some embodiments, the Cluster_type can be vertical flat table with header, vertical flat table without header, horizontal flat table, or cross table. As an example, consider that all section tables will be converted to a single vertical flat table for use by BI programs. In some embodiments, a single horizontal flat table is created.

To begin the process of creation, for section tables constituting a vertical flat table without header, column headers can be generated by auto assignment. When the section table constitutes a horizontal table, rows can be transformed into columns (which results in a vertical flat table).

A section table of the cross table type can be converted to a vertical flat table using the metadata that has been created for the table. For example, consider the cross table of Table IV:

TABLE IV

|  |  | 2000 Purchase | 2000 Sell | 2001 Purchase | 2001 Sell |
|---|---|---|---|---|---|
| India | BANGALORE | 123 | 123 | 345 | 539 |
| India | UP | 123 | 43 | 312 | 123 |
| Ireland | Dublin | 3254 | 34545 | 435 | 43345 |

By making use of the values for Cluster_MaxRight, Cluster_MaxLeft, Cluster_MaxUp, and Cluster_MaxDown variables, the table edge coordinates can be identified as: {(1,1), (1,6),(1,5),(5,6)}, where TableTopleft_addr=(1,1), TableTopright_addr=(1,6), TableBottomleft_addr=(5,1), and TablerBottomright_addr=(5,6).

The table entry point address coordinate is: Cell[1,3] (determined across the Cluster_MaxUp row, where the first non-empty cell is identified).

Converting the cross table of Table IV to a flat table involves four activities:
identifying row header, column header, and data cluster edges
creating row header and column header tuple sets
creating cross product of row and column header tuple sets
associating each tuple with data cluster values To identify the row and column headers, as well as the data cluster edges, clusters occupied by a row header, column header, or data clusters are identified. This involves detecting the presence of one or more of these entities within a cluster.

Data cluster detection can be accomplished along a line segment comprising the cluster entry point address coordinate and the TableTopright_addr coordinate. For Table IV, the first row is scanned between coordinates (1,3) and (1,6).

Two consecutive numeric values in the rows mark the starting point of a data cluster for the cross table. The end of the data cluster would be same as the TableBottomright_addr coordinate. In this case, the data cluster starts at coordinate (3,3) and ends at coordinate (5,6), so the cluster edges are identified by the coordinates: (3,3),(3,6),(5,3),(5,6).

To detect a row header, the row header starting and ending points can be determined as (3,1) and (5,2), respectively, according to the formulae:

$X$ Co-ordinate(start)=DataCluster_StartPoint[$x$]

$Y$ Co-ordinate(start)=TableTopleft_addr[$y$]

$X$ Co-ordinate(end)=TableBottomleft_addr[$x$]

$Y$ Co-ordinate(end)=(DataCluster_StartPoint[$y$])−1

In this case, the row header edges become: (3,1),(3,2),(5,1),(5,2).

To detect a column header, the column header starting and ending points can be determined as (1,3) and (2,6), respectively, according to the formulae:

$X$ Co-ordinate(start)=Table Entry Point Address co-ordinate[$x$]

$Y$ Co-ordinate(start)=DataCluster_StartPoint[$y$]

$X$ Co-ordinate(end)=(DataCluster_StartPoint[$x$])−1

$Y$ Co-ordinate(end)=TablerBottomright_addr[$y$])

In this case, the column header edges become: (1,3),(1,6),(2,3),(2,6).

To create the row header and column header tuple sets, let M11, M12, M13 be the Row1 members of Column header C1; let M21, M22, M23 be the Row2 members of Column Header C1; and let Mn1, Mn2, Mn3 be the RowN members of Column Header C1. In this case the length of all rows is the same. So each row member is mapped with the next row member to generate a tuple set, as: C1 tuple set={(Row11, Row21,Rown1), (Row12,Row22,Rown2), . . . , (Row1n, Rown2n, Rownn)}. In Table IV, the column tuple set is: {(2000, purchase), (2000,sell), (2001,purchase), (2001, sell)}.

Applying the same process for row headers, a row tuple set can also be generated for Table IV, as:
{(India, Bangalore), (India, up), (Ireland, Dublin)}.

To create the cross product of the row and column header tuple sets, the resultant set can be set to Resultant Set=CrossProduct(Row Tuple set, Column tuple set). The Resultant Set can then be generated by determining the cross product of the row tuple set members and the column tuple set members. In this case, the Resultant Set is determined to be:
{(India, Bangalore, 2000, purchase), (India, Bangalore, 2000, sell), (India, Bangalore, 2001, purchase), (India, Bangalore, 2001, sell), (India, UP, 2000, purchase), (India, UP, 2000, sell), (India, UP, 2001, purchase), (India, UP, 2001, sell), . . . , etc}.

To associate each tuple with data cluster values, each tuple is mapped with the numeric values from the data cluster as shown below:
India, Bangalore 2000, Purchase=123
India, Bangalore, 2000, Sell=123
India, Bangalore, 2000, Purchase=345
India, Bangalore, 2000, Sell=539
India, UP, 2000, Purchase=123
India, UP, 2000, Sell=43
India, UP, 2000, Purchase=312
India, UP, 2000, Sell=123

Column names can be automatically assigned as column1, column2, . . . , etc. In some embodiments, the end-user can explicitly provide the names.

Figure 2:
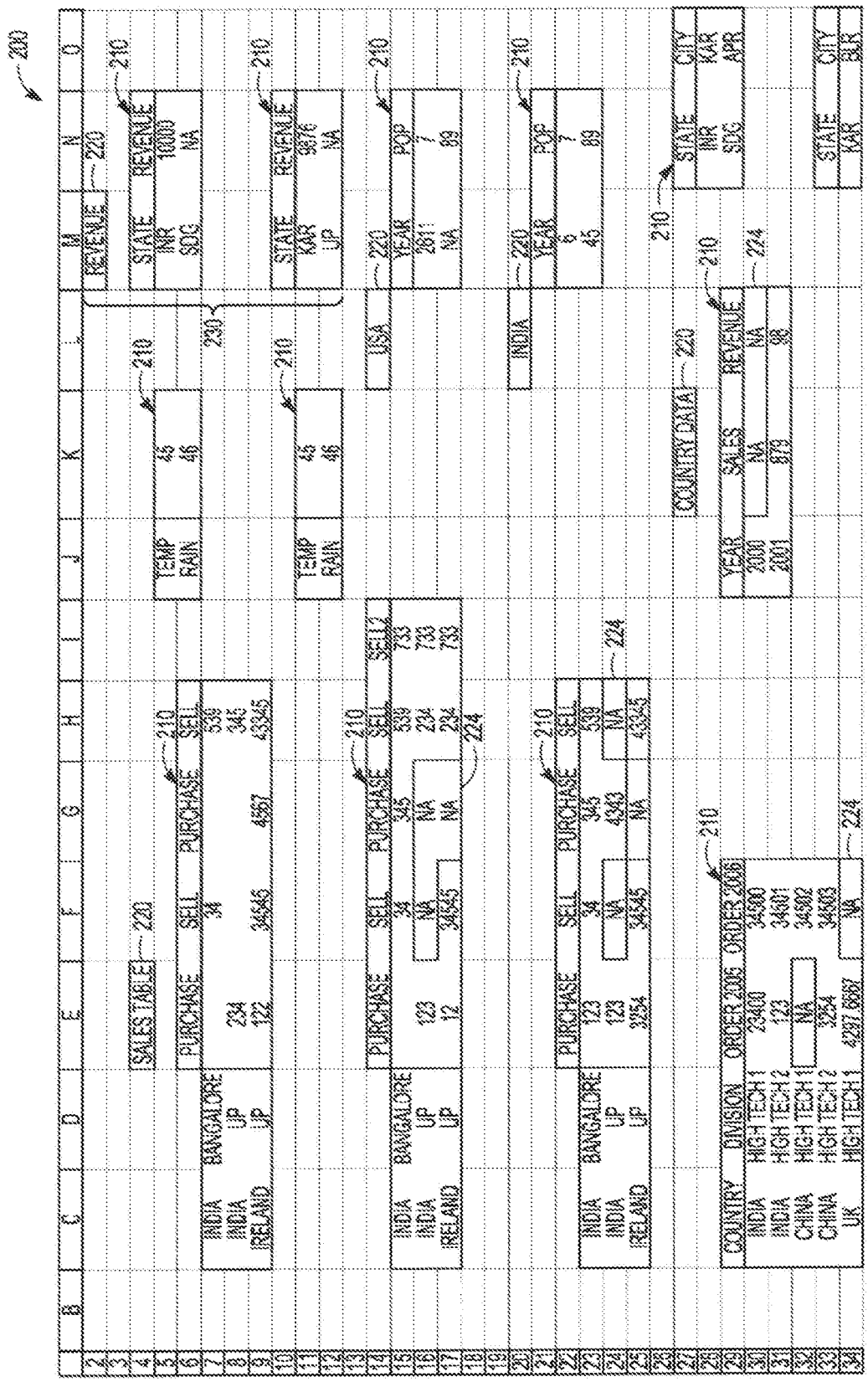
FIG. 2 illustrates a single flat table according to various embodiments of the invention.

FIG. 2 illustrates a single flat table 200 according to various embodiments of the invention. Using the mechanisms described herein, a data file (e.g., a spreadsheet file) can be scanned line by line and the data that is received from the file can be transformed to provide the table 200. Here it can be seen that clusters 210 have been identified, along with section headers 220. This occurs even in the presence of jokers 224. A section table 230 is also shown as the merging of two clusters 210. Thus, many embodiments may be realized.

Figure 3:
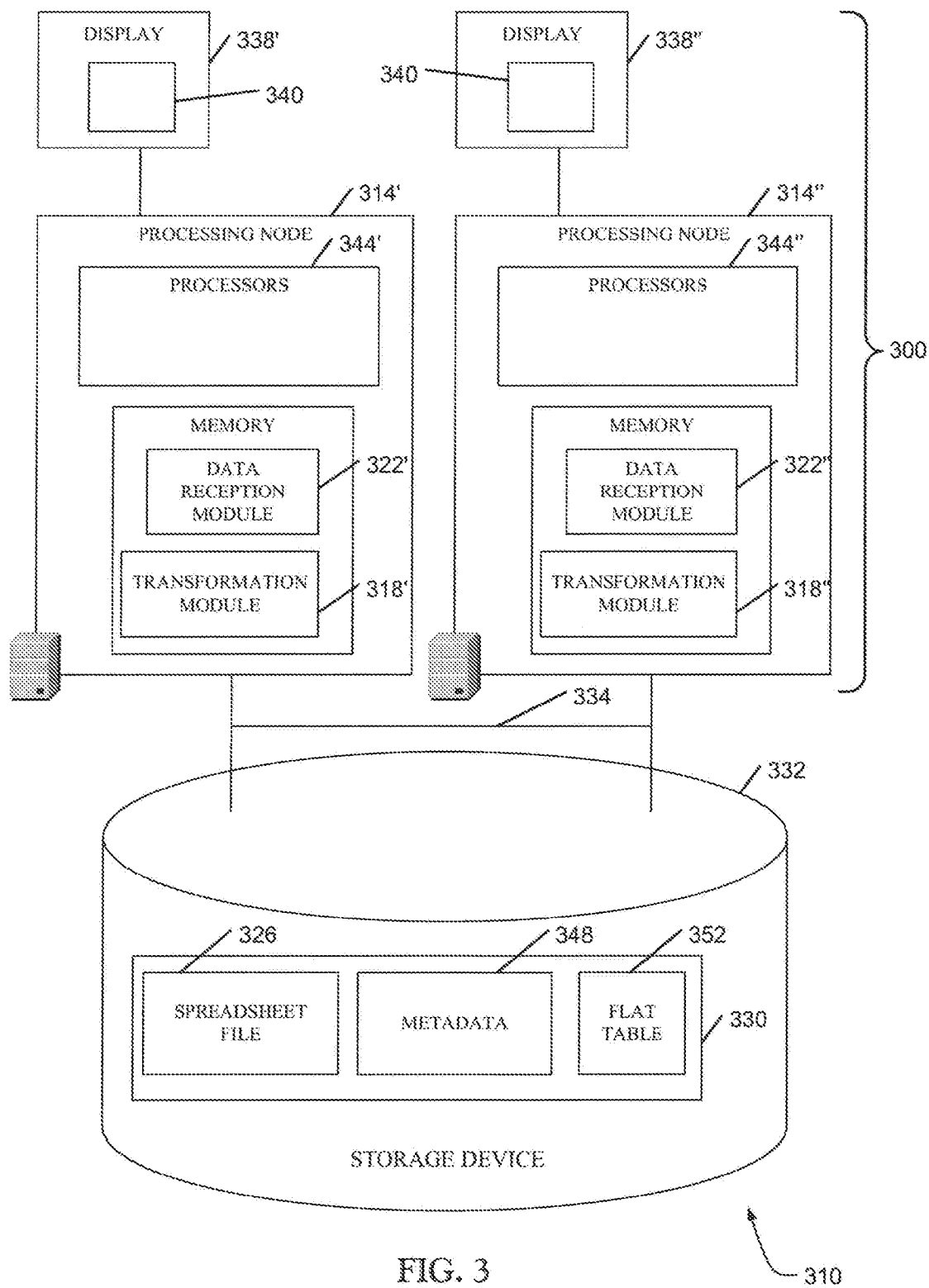
FIG. 3 is a block diagram of apparatus and systems according to various embodiments of the invention.

For example, FIG. 3 is a block diagram of apparatus 300 and systems 310 according to various embodiments of the invention. Thus, in some embodiments, an apparatus 300 to identify clusters in a data file 326 and produce a single flat table 352 comprises a processing node 314' and a transformation module 318'. The processing node 314' may comprise a data reception module 322' to sequentially receive individual lines of information included in a file 326 (e.g., a spreadsheet data file, a database file, etc.) stored in an electronic storage medium, such as the storage device 330. The apparatus 300 may further comprise a transformation module 318' to couple to the processing node 314', the transformation module 318' to detect the existence of data clusters in the file 326 based on neighboring cell content in a horizontal direction corresponding to the individual lines, and in a vertical direction orthogonal to the horizontal direction. The transformation module 318' can operate to identify at least some of the data clusters as being associated with predefined table types comprising vertical tables, horizontal tables, or cross tables. The transformation module 318' may further operate to merge some of the data clusters into section tables having a common orientation (e.g., vertical), a common length (e.g., in the horizontal direction), common cluster table schema, and common relative section header-section body locations (e.g., in the vertical direction). Further, the transformation module 318' may operate to transform the vertical tables, the horizontal tables, the cross tables, the section tables, and remaining un-merged data clusters into a single flat table 352 having a vertical or horizontal orientation.

The apparatus 300 may include multiple processors 344' to handle various parts of the data analysis and transformation. Thus, the apparatus 300 may comprise multiple processors 344', wherein the processing node 314' comprises a first one of the multiple processors, and wherein the transformation module 318' comprises a software module to be executed by a second one of the multiple processors. The apparatus 300 may comprise a server, or a client.

The transformation module 318' may be directly coupled to the processing node 314' by including it in the same processing node 314' where the receipt of data occurs (e.g., transformation module 318'), or by locating it in another processing node 314" (e.g., transformation module 318"), perhaps indirectly coupled via a storage medium 330, or a network 334.

The characteristics of clusters may be stored as metadata 348, including cluster sequence numbers (e.g., perhaps based on time of discovery within the data as it is received from the file 326), cluster types, cluster sizes, cluster edge locations, etc. In some embodiments, the cluster size is computed from cluster edge locations. Thus, the metadata 348 comprises object label names, object qualifications, and/or object data types, among others. The apparatus 300 may take the form of a desktop or laptop computer, a cellular telephone or personal digital assistant (PDA), a server, a client, as well as other devices.

In some embodiments, the apparatus 300 includes a display 338 to display output from the apparatus 300 to an end-user. For example, the metadata 348, newly created by the apparatus 300, may be displayed. Thus, the apparatus 300 may comprise one or more displays 338 to display rows and columns of the spreadsheet file 326 according to the orientation of the tables that have been created, and the data that is received from the file 326. The apparatus 300 may further include a display 338' to display the end result: a single flat table 352. Thus, the apparatus 300 may further comprise a display 338' to display rows and columns of the single flat table 352 according to the vertical or horizontal orientation. Additional embodiments may be realized.

For example, a system 310 may comprise multiple processing nodes, such as more than one of the apparatus 300. Thus, a system 310 may divide operations of the apparatus 300 among separate nodes 314', 314", perhaps connected by a network 334.

In some embodiments, a system 310 comprises a first processing node 314' comprising a data reception module 322' to sequentially receive individual lines of information included in a file 326 stored in an electronic storage medium 330. The system 310 may further include a second processing node 314" comprising a transformation module 318" to couple to the first processing node 314', the transformation module 318" in the same way as described with respect to the transformation module 318', detecting the existence of data clusters, identifying the data clusters as being associated with predefined table types, merging the data clusters into section tables, and transforming the tables and remaining un-merged data clusters into a single flat table 352.

The system 310 may comprise a client in communication with a server. Thus, the first processing node 314' may comprise a client node, and the second processing node 314" may comprise a server node.

Another node 332, to store the spreadsheet file, may be added to the system 310. Thus, the system 310 may further comprise a third node 332 to house the electronic storage medium 330.

The nodes of the system 310 may comprise physical nodes, virtual machines, and combinations of these. The system 310 may include multiple servers and clients. Still further embodiments may be realized.

Figure 4:
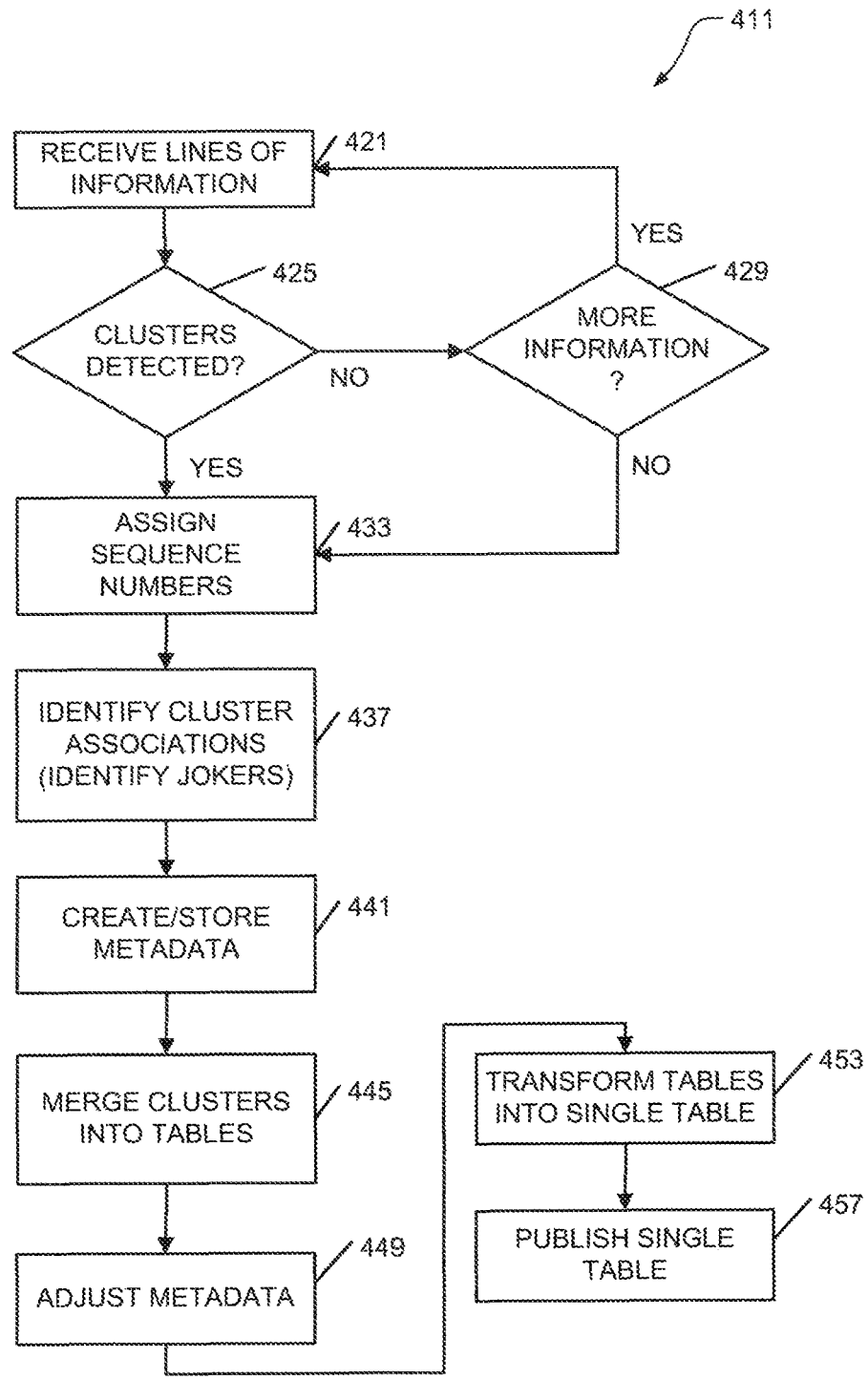
FIG. 4 is a flow diagram illustrating several computer-implemented methods according to various embodiments of the invention.

For example, FIG. 4 is a flow diagram illustrating several computer-implemented methods 411 according to various embodiments of the invention. The methods 411 are implemented in a machine-accessible and readable medium and are operational over processes within and among networks. The networks may be wired, wireless, or a combination of wired and wireless.

The methods 411 may be implemented as instructions, which when accessed by a specific machine, perform the processing depicted in FIG. 4. In some embodiments, a method 411 includes accessing a spreadsheet file, detecting clusters, associating clusters with predefined table types, creating section tables from some of the clusters, and creating a single flat table using the identified clusters, section tables, and remaining clusters.

A processor-implemented method 411 to execute on one or more processors that perform the method may begin at block 421 with accessing (e.g., by scanning or receiving in response to a request), sequentially, individual lines of information included in a spreadsheet file stored in an electronic storage medium.

The method 411 may continue on to block 425 with detecting the existence of data clusters in the file based on neighboring cell content in a horizontal direction (e.g., corresponding to the individual lines), and in a vertical direction (e.g., orthogonal to the horizontal direction).

The activity at block 425 may comprise detecting the existence of a cell in one of the individual lines of information, the cell having neighbors in each of more than one of the data clusters. The activity may further include associating the cell with one or the other of the data clusters according to when the existence of the data clusters was detected in time.

The activity at block 425 may comprise identifying parent ones of the data clusters and orphan ones of the data clusters. The activity may further include merging the one of the orphan clusters into the one of the parent clusters when one of the parent clusters is a parent of one of the orphan clusters.

The activity at block 425 may comprise applying a decision tree algorithm to the individual lines of information to determine the existence of vertical tables, horizontal tables, and cross tables. The decision tree algorithm may include an exception handling algorithm (e.g., to handle jokers).

If no clusters are detected at block 425, then the method 411 may continue on to block 429 to determine whether additional information exists in the file. This may include determining whether the end of a line has been reached, or whether the end of the file has been reached. If there is more information in the file, the method 411 may include returning to block 421. If no more information is available, then the method 411 may move from block 429 to block 433. The method 411 may also continue from block 425 to block 433 when clusters are detected.

At block 433, the method 411 may comprise assigning sequence numbers to the data clusters that have been detected. The sequence numbers may be used in determining whether a cell in the file belongs to a first one of the data clusters or a second one of the data clusters, when the cell is proximate to the first one and the second one.

The method 411 may continue on to block 437, with identifying at least some of the data clusters as being associated with predefined table types, such as vertical tables, horizontal tables, and/or cross tables. The activity at block 437 may include halting association of one of the data clusters with one of the predefined table types upon detecting the existence of different joker values in the one of the data clusters.

The method 411 may continue on to block 441 with creating metadata that includes cluster characteristics for one or more of the data clusters, and storing the metadata in a data structure associated with the single flat table that is to be produced. The activity at block 441 may include storing label and section headers as part of the metadata in the data structure.

The method 411 may continue on to block 445, to include merging some of the data clusters into section tables having a common orientation, a common length, a common cluster table schema, and/or common relative section header-section body locations.

The method 411 may continue on to block 449 with adjusting metadata values, such as by adjusting the size of the data clusters as additional cells belonging to the clusters are discovered during the activity of block 425.

The method 411 may continue on to block 453 to include transforming the vertical tables, the horizontal tables, the cross tables, the section tables, and any remaining un-merged data clusters into a single flat table having a vertical or horizontal orientation. Additional activity may comprise generating column headers by automatic assignment for one or more of the vertical tables upon detecting the absence of a column header associated with the vertical tables.

The method 411 may conclude, in some embodiments, at block 457, with publishing at least a portion of the single flat table in human-perceivable form.

The methods described herein do not have to be executed in the order described, or in any particular order. Moreover, various activities described with respect to the methods identified herein can be executed in repetitive, serial, or parallel fashion. The individual activities of the methods 411 shown in FIG. 4 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, logic, or managers that operate to perform one or more operations or functions. The modules, logic, and managers referred to herein may, in some example embodiments, comprise processor-implemented modules, logic, or managers.

Similarly, the methods described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 5:
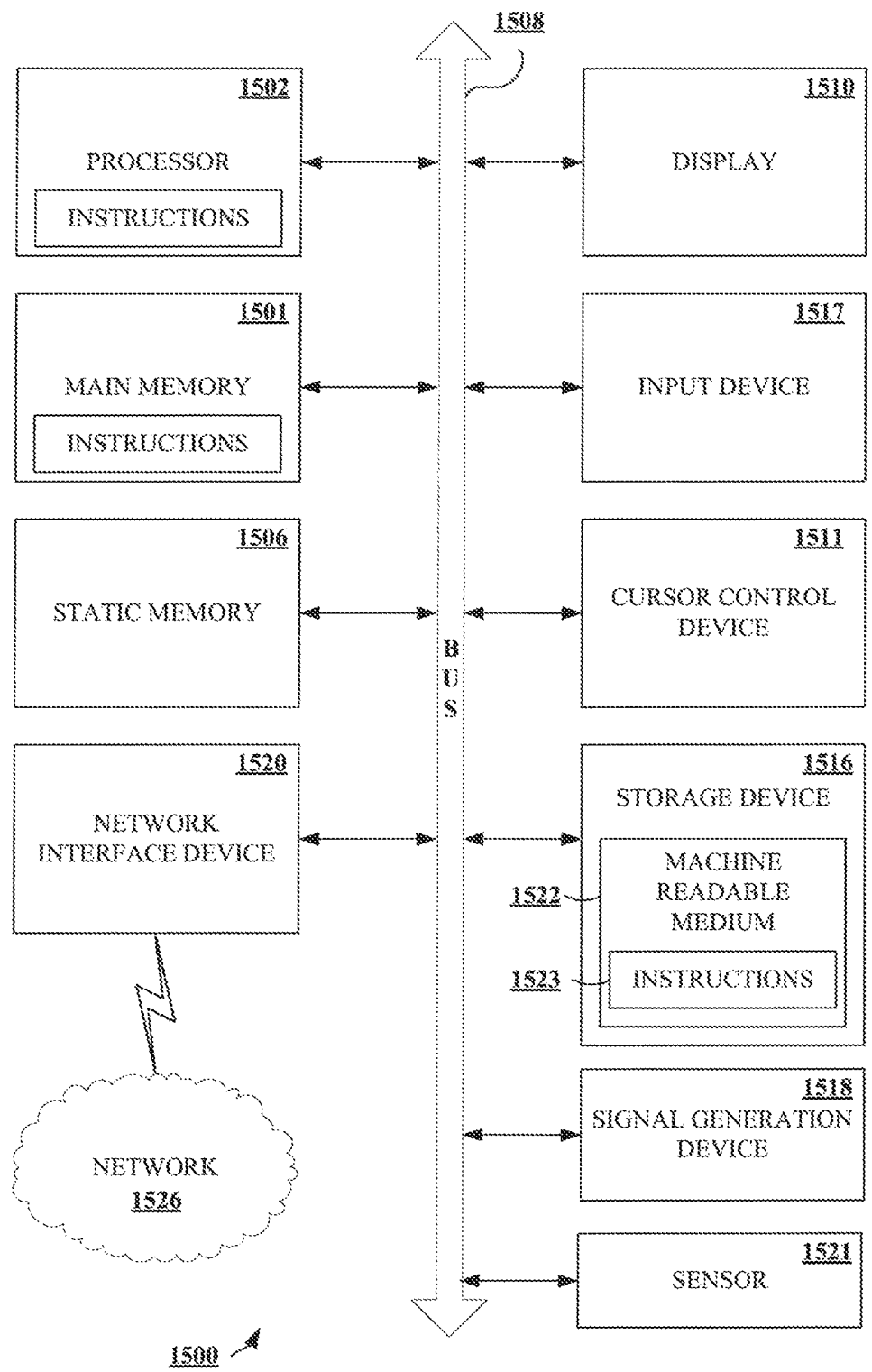
FIG. 5 is a block diagram of an article of manufacture, in the form of a specific machine, according to various embodiments of the invention.

For example, FIG. 5 is a block diagram of an article of manufacture, including a specific machine, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1502 coupled to a machine-readable medium 1522 such as a memory (e.g., removable storage media, as well as any memory including an electrical, optical, or electromagnetic conductor) having instructions 1523 stored thereon (e.g., computer program instructions), which when executed by the one or more processors 1502 result in the machine performing any of the actions described with respect to the methods above. In some embodiments, the article of manufacture comprises a machine-readable medium 1522, such as a CD-ROM or other non-volatile memory, to store the instructions 1523.

In some embodiments, a computer system 1500 may operate as a specific machine that includes a processor 1502 (e.g., a central processing unit (CPU), a graphics processing unit (GPU) or both), a main memory 1501 and a static memory 1506, which communicate with each other using a bus 1508. The computer system 1500 may further include a display unit 1510, an alphanumeric input device 1517 (e.g., a keyboard), and a user interface (UI) navigation device 1511 (e.g., a mouse). In some embodiments, the display, input device and cursor control device form part of a touch screen display. The computer system 1500 may additionally include a storage device 1516 (e.g., disk drive unit), a signal generation device 1518 (e.g., a speaker), a network interface device 1520, and one or more sensors 1521, such as a global positioning system sensor, compass, accelerometer, or other sensor.

The computer system 1500 may comprise a specific machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The system 1500 may be similar to or identical to the apparatus 300 or system 310 of FIG. 3.

Returning to FIG. 5, it can be seen that the storage device 1516 includes a machine-readable medium 1522 on which is stored one or more sets of instructions and data structures (e.g., instructions 1523) embodying or utilized by any one or more of the methodologies or functions described herein. The instructions 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Implementing the apparatus, systems, and methods described herein may operate to render the processing of large data files more efficiently, providing higher performance and a simplified desktop experience. More efficient allocation of processing resources, and increased user satisfaction, may also result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

APPENDIX

The algorithm that follows is one of many that may be implemented as part of some of the embodiments described herein. It should be noted that portions of spreadsheets are shown below that are not meant to be assembled into a single, integrated whole. Rather, to assist in understanding the information processing illustrated herein, these spreadsheet portions have been constructed to illustrate a wide variety of arrangements for the data shown, including changes in orientation and content type.

>>>START ALGORITHM

Summary: Upon scanning the first row of a file, structure for all the three table types is generated. The structure is updated as subsequent rows are scanned. Based on the content of each cell, each structure is updated and checked by comparing to the basic template, according to the rules contained in the Detailed Description. Structures which fail to match during each row scan are removed, and that table type is removed from the decision tree. The algorithm will now be described in three parts.

Part 1. Identification of a Vertical Table:

A possible data structure for a vertical table is as follows:

ColHeader

Column Type

Number of NonJoker Strings in column

Numeric counter

Value of Joker

First cell type in first row

In this data structure, the various elements are described below:

ColHeader: Obtained as values from the first row. Condition is that all the cells should be non-empty and unique, else leave this as blank and table type is not a vertical flat table with header. If table is identified as vertical flat table with header, all the other data structures are generated from the second row onwards. Else if a table is identified that is not a vertical flat table with header, then start generating all other data structures from the first row.

Number of NonJoker Strings in the column: this can be a counter that records the number of string values in a column. If this count is greater than or equal to two, then the type of column is identified as String type. For counting, the following logic may be used. While going down in a column from one cell to another:

| | | |
|---|---|---|
| If a string is followed by the same string | No conclusion | Number of NonJoker strings in column remains same |
| If a string is followed by a different string | Increase count by 1 | Number of NonJoker strings in column count increases by 1 |

Numeric counter: counts the numeric values in a column. If the counter value is greater than or equal to one then Column type is identified as Numeric.

Value of joker:
  a. upon moving down a column from one cell to another, if numeric value is followed by string value then that string value is taken as Joker.
  b. upon moving down a column from one cell to another, if String value is followed by Numeric value then that string value is taken as Joker.

It is also possible that identified joker may repeat more than one time in a column. If Joker value changes from one column to another column then column type becomes Unknown and cluster will not be of the vertical table type. Also if Column Having Number of NonJoker Strings≥2, Numeric count≥1, and a Joker exists, then column type becomes Unknown and the cluster will not be of the vertical table type.

First cell type in first row: if the first cell is empty in the first row then table is not a vertical flat table.

Thus, the column type depends on:

| Condition | Column type |
|---|---|
| Column Having Numeric count >=1 and a Joker | Numeric |
| Column Having Number of NonJoker Strings >=2 and a Joker | String |
| Column Having Number of NonJoker Strings >=2, Numeric count >=1 and a Joker | Unknown |
| Column Having Number of NonJoker Strings >=2 | String |
| Column Having Number of Numeric count >=1 | Numeric |

Part 2. Identification of Horizontal Table:

A possible data structure for a horizontal table is as follows:

ColHeader (1st cell value)
Row Type
Number of NonJoker Strings in row (starts from 2nd cell)
Numeric counter (starts from 2nd cell)
Value of Joker
First cell type in first row In this data structure, the various elements are described below:

ColHeader: can be obtained as values of the first cell in each row. All the cells should be non-empty and unique, else leave this as blank and table type is not horizontal flat table with header.

Number of NonJoker Strings in row: a counter that records the number of string values in a row. This count begins with the second cell of each row. If this count is greater than or equal to 2 then type of row is identified as String type.

Numeric counter: records the number of numeric values in a row. The count begins from the second cell of each row. If the Numeric counter is greater than or equal to 1 then the row type is identified as Numeric.

Value of joker:
  a. upon moving in a row from one cell to another, if numeric value is followed by string value then that string value is taken as Joker.
  b. upon moving in a row from one cell to another, if String value is followed by Numeric value then that string value is taken as Joker.

It is also possible that an identified joker may repeat more than one time in a row. If the value of the Joker changes from one row to another, then the row type will become Unknown and the cluster will not be of the horizontal table type. If the Row Having Number of NonJoker Strings>=2, Numeric count>=1, and a Joker exists, then the Row Type becomes Unknown and cluster will not be of the horizontal table type.

First cell type in first row: if the first cell in the first row is empty, then table is not a horizontal table.

Thus, the row type depends on:

| Condition | Row type |
|---|---|
| Row Having Numeric count >=1 and a Joker | Numeric |
| Row Having Number of NonJoker Strings >=2 and a Joker | String |
| Row Having Number of NonJoker Strings >=2, Numeric count >=1 and a Joker | Unknown |
| Row Having Number of NonJoker Strings >=2 | String |
| Row Having Number of Numeric count >=1 | Numeric |

Part 3. Identification of a Cross Table:

A possible data structure for a cross table is as follows:

Row Type
Number of NonJoker Strings in row
Numeric counter
DataCluster_Maxleft
Value of Joker In this data structure, the various elements are described below:

Number of NonJoker Strings in row: this counter records the number of string values in a row.

Numeric counter: this counter records the number of numeric values in a row.

DataCluster_Maxleft: this value is based on the first occurrence of a Numeric value across a column, and will be used to set a starting point for detecting Jokers.

Value of joker: Jokers are detected from DataCluster_Maxleft column value.
  a. upon moving in a row from one cell to another, if a numeric value is followed by a string value, then that string value is taken as Joker.
  b. upon moving in a row from one cell to another, if a String value is followed by a Numeric value, then that string value is taken as Joker.

It is possible that an identified joker may repeat more than one time in a row. If the value of the Joker changes from one row to another row, the table will not be a cross table; it may be a junk table (or some other unidentified type). Here the unknown data type is allowed, and will not result in a failure to match the cross table template, as might occur for the horizontal/vertical table templates.

Thus, the row type can be decided based on the following conditions:

| Condition | Row type |
|---|---|
| Row Having Numeric count >=1 and a Joker | Numeric |
| Row Having Number of NonJoker Strings >=2 and a Joker | String |
| Row Having Number of NonJoker Strings >=2, Numeric count >=1 and a Joker | Unknown |
| Row Having Number of NonJoker Strings >=2 | String |
| Row Having Number of Numeric count >=1 | Numeric |

After implementing these three parts of the algorithm, the table type is identified. The metadata stored for a table can be generated as follows:

Structure Cluster_UID={UID, Cluster_type, Cluster_ColHeader [ ], Cluster_MaxRight[y], Cluster_MaxLeft[y], Cluster_MaxUp[x], Cluster_MaxDown[x],Cluster_Sections [SectionName, DistanceY, relative_position], Cluster_Name}.

For the CrossTab table type, the value of Cluster_ColHeader would be null.

Extensions to the Algorithm:

If the decision tree has more than one element left at the end then user input can be received to determine the type of table.

If a table is identified as a vertical table as well as a horizontal table, then the table type may be taken as a vertical table, according to design preference, or vice versa.

>>>END ALGORITHM

An Example to Demonstrate the Operation of the Algorithm Follows:

For any table to be classified as a cross table, vertical flat table, or horizontal flat table, it should satisfy the template conditions described previously. If no template matches, then the table type can be set to "Junk". To identify a table to be of a particular type, the Data Structure for each of the three types of table is generated. In each row scan a decision tree is formed, where several possibilities are proposed, and then the proposals are modified/validated on the following line of the table. Thus, each line of the table is checked on the basis of the standard templates. During the modification/validation phase, an algorithm can operate to prune the tree. Pruning the tree removes the leaf which does not support the template for that table. For this example, consider the following cluster of information:

| Purchase | Sell | Revenue | Country |
|---|---|---|---|
| Pickles | 43 | 43 | India |
| Sweets | NA | 43 | UK |
| Chocolates | 43 | 454 | US |

After the first row scan, the Data Structures for the Vertical Table are:

| | ColHeader | | | |
|---|---|---|---|---|
| | Purchase | Sell | Revenue | Country |
| Column Type | | | | |
| Number of NonJoker Strings in column | | | | |
| Numeric counter | | | | |
| Value of Joker | | | | |
| First cell type in a First row | String | | | |

Note: As table has all string headers which are NonJoker, the table can be identified as a vertical flat table. Other Data Structure members of vertical table are started to fill from next row onwards.

Data Structures for a Horizontal Table are:

| | ColHeader Purchase |
|---|---|
| Row Type | String |
| Number of NonJoker Strings in column | 3 |
| Numeric counter | 0 |
| Value of Joker | |
| First cell type in a First row | String |

Data Structures for a Cross Table are:

| Row Type | String |
|---|---|
| Number of NonJoker Strings in row | 4 |
| Numeric counter | 0 |
| DataCluster_Maxleft | |
| Value of Joker | |

Decision tree: Horizontal Table, Vertical Table, Cross Table

After the second row scan, the Data Structures for the Vertical table are:

| | ColHeader | | | |
|---|---|---|---|---|
| | Purchase | Sell | revenue | profit |
| Column Type | | N | N | |
| Number of NonJoker Strings in column | 1 | | | 1 |
| Numeric counter | | | 1 | 1 |
| Value of Joker | | | | |
| First cell type in a First row | String | | | |

Data Structures for Horizontal Table are:

| | ColHeader | |
|---|---|---|
| | Purchase | Pickles |
| Row Type | String | Numeric |
| Number of NonJoker Strings in column | 3 | 1 |
| Numeric counter | 0 | 2 |
| Value of Joker | | India |
| First cell type in a First row | String | String |

Data Structures for the Cross Table are:

|  | Row Type | |
| --- | --- | --- |
|  | String | Unknown |
| Number of NonJoker Strings in row | 4 | 2 |
| Numeric counter | 0 | 2 |
| DataCluster_Maxleft |  | 2 |
| Value of Joker |  | India |

Decision tree: Horizontal Table, Vertical Table, Cross Table

After scanning the third row, the Data Structures for the Vertical table are:

|  | ColHeader | | | |
| --- | --- | --- | --- | --- |
|  | Purchase | Sell | revenue | profit |
| Column Type | S | N | N | S |
| Number of NonJoker Strings in column | 2 |  |  | 2 |
| Numeric counter |  | 1 | 2 |  |
| Value of Joker |  | NA |  |  |
| First cell type in a First row | String |  |  |  |

Data Structures for the Horizontal Table:

|  | ColHeader | | |
| --- | --- | --- | --- |
|  | Purchase | Pickles | sweets |
| Row Type | String | Numeric | UnKnown |
| Number of NonJoker Strings in column | 3 | 1 | 2 |
| Numeric counter | 0 | 2 | 2 |
| Value of Joker |  | India | NA |
| First cell type in first row | String |  |  |

Note: Value of Joker has been changed from "India" to "NA", so set the RowType to Unknown.

Data Structures for the Cross Table are:

|  | Row Type | | |
| --- | --- | --- | --- |
|  | String | Unknown | Unknown |
| Number of NonJoker Strings in row | 4 | 2 | 3 |
| Numeric counter | 0 | 2 | 2 |
| DataCluster_Maxleft |  | 2 | 2 |
| Value of Joker |  | India | UK |

Since the Numeric counter is equal to 1 and the Number of NonJoker strings is equal to 2, the situation arises in which a row has both numeric as well as String type variables. The change in the value of the joker results in an unknown Row data type, which violates the template conditions for a Horizontal Table. In addition, for the Cross Table Data Structures, the value of the joker changed from "India" to "UK" along the data cluster. Thus, the table is not a cross table type.

Decision tree: Vertical Table

After scanning the fourth row, the Data Structures for the Vertical table are:

|  | ColHeader | | | |
| --- | --- | --- | --- | --- |
|  | Purchase | Sell | revenue | profit |
| Column Type | S | N | N | S |
| Number of NonJoker Strings in column | 3 |  |  | 3 |
| Numeric counter |  | 2 | 3 |  |
| Value of Joker |  |  |  |  |
| First cell type in a First row | String |  |  |  |

Decision tree: Vertical Table

Thus, the final result in this example is that the cluster is identified as, and associated with, a vertical table type.

What is claimed is:

1. An apparatus, comprising:
   a processing node, implemented by one or more hardware processors, comprising a data reception module to sequentially access individual lines of information included in a file stored in an electronic storage medium; and
   a transformation module, implemented by the one or more hardware processors, to couple to the data reception module, the transformation module configured
      to detect existence of data clusters in the file, the detecting comprising associating a cell with a new data cluster or an existing data cluster, based on comparing the cell with adjacent cells in a horizontal direction corresponding to the individual lines,
      to generate metadata including characteristics associated with each of the data clusters,
      to identify at least some of the data clusters as being associated with predefined table types comprising vertical tables, horizontal tables, or cross tables,
      to merge one or more of the data clusters having common cluster table schemas into section tables, based on the metadata, and
      to transform the vertical tables, the horizontal tables, the cross tables, the section tables, and remaining un-merged data clusters into a single flat table having a vertical or horizontal orientation, based on the metadata.

2. The apparatus of claim 1, wherein the transformation module is further configured to determine that said one or more of the data clusters have the common cluster table schemas, based on the metadata.

3. The apparatus of claim 1, wherein the transformation module is further configured to adjust values included in the metadata that identify a size of one of the data clusters, based on additional cells belonging to the one of the data clusters discovered during the detecting.

4. The apparatus of claim 1, wherein the metadata includes sequence numbers corresponding to the data clusters, the sequence numbers indicating a sequence in which the data clusters are detected.

5. A system, comprising:
   a first processing node, implemented by one or more hardware processors, comprising a data reception module to sequentially access individual lines of information included in a file stored in an electronic storage medium; and
   a second processing node comprising a transformation module implemented by the one or more hardware processors to couple to the data reception module in the first processing node, the transformation module
      to detect existence of data clusters in the file, the detecting comprising associating a cell with a new data cluster or an existing data cluster, based on comparing the cell with adjacent cells in a horizontal direction corresponding to the individual lines,
to generate metadata including characteristics associated with each of the data clusters,
to identify at least some of the data clusters as being associated with predefined table types comprising vertical tables, horizontal tables, or cross tables,
to merge one or more of the data clusters having common cluster table schemas into section tables, based on the metadata, and
to transform the vertical tables, the horizontal tables, the cross tables, the section tables, and remaining un-merged data clusters into a single flat table having a vertical or horizontal orientation, based on the metadata.

6. The system of claim 5, wherein the transformation module is further configured to determine that said one or more of the data clusters have the common cluster table schemas, based on the metadata.

7. The system of claim 5, wherein the transformation module is further configured to adjust values included in the metadata that identify a size of one of the data clusters, based on additional cells belonging to the one of the data clusters discovered during the detecting.

8. A processor-implemented method to execute on one or more processors that perform the method, comprising:
accessing, sequentially, individual lines of information included in a file stored in an electronic storage medium;
detecting existence of data clusters in the file, the detecting comprising associating a cell with a new data cluster or an existing data cluster, based on comparing the cell with adjacent cells in a horizontal direction corresponding to the individual lines,
generating metadata including characteristics associated with each of the data clusters,
identifying at least some of the data clusters as being associated with predefined table types comprising vertical tables, horizontal tables, or cross tables,
merging one or more of the data clusters having common cluster table schemas into section tables, based on the metadata, and
transforming the vertical tables, the horizontal tables, the cross tables, the section tables, and remaining un-merged data clusters into a single flat table having a vertical or horizontal orientation, based on the metadata.

9. The method of claim 8, wherein the metadata includes edge coordinate values identifying the upper edge, lower edge, left edge and right edge of each of the data clusters.

10. The method of claim 8, wherein the metadata includes sequence numbers corresponding to the data clusters, the sequence numbers indicating a sequence in which the data clusters are detected.

11. The method of claim 8, wherein the metadata includes section header position information describing a position of a section header associated with at least one of the data clusters.

12. The method of claim 8, wherein the metadata includes column header labels of at least one of the data clusters.

13. The method of claim 8, further comprising:
adjusting values included in the metadata identifying a size of one of the data clusters, based on additional cells belonging to the one of the data clusters discovered during the detecting.

14. The method of claim 8, wherein the merging further comprises:
determining that said one or more of the data clusters have the common cluster table schemas, based on the metadata.

15. The method of claim 14, wherein the determining further comprises:
determining that left edges and right edges of said one or more of the data clusters are the same, based on edge coordinate values included in the metadata.

16. The method of claim 14, wherein the determining further comprises:
determining that column header labels of said one or more of the data clusters are the same, based on the metadata.

17. The method of claim 14, wherein the determining further comprises:
determining that relative section header positions of said one or more of the data clusters are the same, based on section header position information included in the metadata.

18. The method of claim 8, wherein the transforming further comprises:
generating column headers by automatic assignment for one of the vertical tables upon detecting absence of a column header associated with the one of the vertical tables.

19. A non-transitory computer-readable storage medium containing executable instructions stored thereon which, when executed, result in a processor performing:
accessing, sequentially, individual lines of information included in a file stored in an electronic storage medium;
detecting existence of data clusters in the file, the detecting comprising associating a cell with a new data cluster or an existing data cluster, based on comparing the cell with adjacent cells in a horizontal direction corresponding to the individual lines,
generating metadata including characteristics associated with each of the data clusters,
identifying at least some of the data clusters as being associated with predefined table types comprising vertical tables, horizontal tables, or cross tables,
merging one or more of the data clusters having common cluster table schemas into section tables, based on the metadata, and
transforming the vertical tables, the horizontal tables, the cross tables, the section tables, and remaining un-merged data clusters into a single flat table having a vertical or horizontal orientation, based on the metadata.

20. The non-transitory computer-readable storage medium of claim 19, containing executable instructions stored thereon which, when executed, result in the processor further performing:
adjusting values included in the metadata identifying a size of one of the data clusters, based on additional cells belonging to the one of the data clusters discovered during the detecting.

* * * * *